United States Patent [19]

Mohr

[11] 4,411,167
[45] Oct. 25, 1983

[54] BREAKAWAY SHAFT ASSEMBLY

[75] Inventor: John D. Mohr, Livonia, Mich.

[73] Assignee: Ford Motor Company, Dearborn, Mich.

[21] Appl. No.: 310,566

[22] Filed: Oct. 13, 1981

[51] Int. Cl.³ .............................................. B62D 1/18
[52] U.S. Cl. ..................... 74/492; 280/777; 403/2; 188/371
[58] Field of Search ............... 74/492, 493; 280/777; 403/2, DIG. 4; 188/371, 376

[56] References Cited

U.S. PATENT DOCUMENTS

| | | | |
|---|---|---|---|
| 3,262,332 | 7/1966 | Wight | 74/493 |
| 3,392,599 | 7/1968 | White | 74/492 |
| 3,424,263 | 1/1969 | Black | 74/492 X |
| 3,461,740 | 8/1969 | Tajima et al. | 74/492 |
| 3,472,093 | 10/1969 | Tenniswood | 74/492 |
| 3,477,307 | 11/1969 | Maddox | 280/777 X |
| 3,600,971 | 8/1971 | Scarvelis et al. | 74/492 |
| 3,717,046 | 2/1973 | Takao et al. | 74/492 |
| 3,757,601 | 9/1973 | Burke | 74/492 |
| 3,788,148 | 1/1974 | Connell et al. | 74/492 |
| 3,877,319 | 4/1975 | Cooper | 74/492 |
| 3,923,319 | 12/1975 | Nonaka et al. | 74/492 X |
| 4,014,219 | 3/1977 | Feustel | 74/492 |

FOREIGN PATENT DOCUMENTS

| | | | |
|---|---|---|---|
| 14219 | 8/1980 | European Pat. Off. | 74/492 |
| 2649962 | 5/1978 | Fed. Rep. of Germany | 74/492 |
| 2630097 | 5/1978 | Fed. Rep. of Germany | 74/492 |
| 1502617 | 3/1978 | United Kingdom . | |

*Primary Examiner*—Allan D. Herrmann
*Attorney, Agent, or Firm*—Joseph W. Malleck; Olin B. Johnson

[57] ABSTRACT

A breakaway shaft assembly is disclosed which comprises a segmented tube and shaft member. The tube member and at least one of the shaft member segments are retained together for conjoint movement under axial loading until the shaft segments are interengaged. Additional axial loading and movement severs the attachment between the tube member and shaft segment allowing the tube member to telescope further until limited. At such limitation, the location of segmentation for each of the tube and shaft members is aligned permitting breakaway separation in response to still further axial loading.

10 Claims, 17 Drawing Figures

BREAKAWAY SHAFT ASSEMBLY

BACKGROUND OF THE INVENTION

This invention relates to a breakaway shaft assembly and, more particularly, to a vehicular steering shaft linkage having an impact absorbing apparatus as well as a breakaway apparatus effective to counter the primary impact as well as secondary impact that occurs in a collision of such vehicle.

Particularly in trucks, the steering linkage must extend from the steering wheel through a steering column assembly and through a secondary steering shaft which interconnects the steering column with the steering gear box. During a collision, the primary impact of hitting an object with the vehicle may cause the steering gear box itself to be pushed rearward toward and through the vehicle compartment. During the secondary impact, when the driver's body is thrown forward impacting the steering wheel, the normal devices used to allow the steering column itself to collapse are countered by the shifted lower steering linkage which has been moved oppositely as a result of the primary impact.

The various arrangements which have been developed for collapsing steering columns per se principally fall into two categories, one of which includes the shortening of the steering column by a telescoping movement of inner and outer tubes to absorb energy by the retraction of the column itself (see U.S. Pat. Nos. 3,877,319 and 3,262,332). Camming elements may be employed in such telescoping movement to deform one of the tubes to increase the energy absorption characteristics (see further U.S. Pat. Nos. 3,392,599; 3,461,740; 3,788,148; 3,717,046 and 3,757,601). Another is to have the column pivot about some point that permits it to move in a direction other than in axial collapse (see U.S. Pat. No. 3,923,319). Although none of the above steering column apparatus actually break away during a secondary impact, developments have been made in the art to visualize the concept of actually allowing the linkage to break at some point and become severed (see U.S. Pat. Nos. 3,600,971; 3,424,263; 4,014,219 and British Pat. No. 1,502,617).

What has not been visualized nor attained by the prior art is the construction of steering linkage which breaks away if necessary under a predetermined load upon primary impact and allows the steering linkage to additionally or alternatively collapse under the secondary impact of the driver.

SUMMARY OF THE INVENTION

The invention is a breakaway shaft assembly which is effective to respond to a vehicular collision by utilizing, first, a staged telescoping movement, followed by a cammed breakaway of the shaft. The invention provides for both a staged breakaway of one portion of the steering linkage during primary impact and a collapsing telescoping movement of the steering column upon secondary impact.

The shaft assembly comprises a segmented shaft member, a segmented tube member, at least one of the segmented shaft and tube members have mating camming surfaces at the location of segmentation. The assembly further comprises means for retaining the segmented tube member and one of the shaft member segments together for conjoint axial movement when under axial loading until the shaft member segments are interengaged, whereupon the tube member segments telescopically move relative to the shaft member segments in response to further axial loading. The assembly additionally comprises means for limiting the telescopic travel of the tube member relative to the shaft member when the location of segmentation for each of the tube and shaft members is aligned, whereupon breakaway separation of the segments of each of said members occurs in response to still further axial loading.

The segmented shaft member can preferably be formed so that the mating surfaces of the segments have camming surfaces which when axially loaded will cause the members to bias apart. Similarly, the segmented tube members are preferably formed with stepped camming surfaces which, when aligned with the camming surfaces of the shaft member segments, permit the entire assembly to break away under additional axial loading.

The retaining means preferably may comprise pins which are sheared upon a predetermined axial load being attained, such pins being preferably made of plastic. Alternatively, a metallic rivet or plastic putty inserted into mating grooves in the shaft and tube may be used as the retaining means.

The limit means may preferably comprise yoke members at the ends of each of the shaft and tube members where, during telescopic movement, one may abut the other.

It is advantageous if additional friction means or bias means are employed between the telescoping members of the assembly so that, during such telescoping movement, additional energy is absorbed.

DETAILED DESCRIPTION

Figure 1:
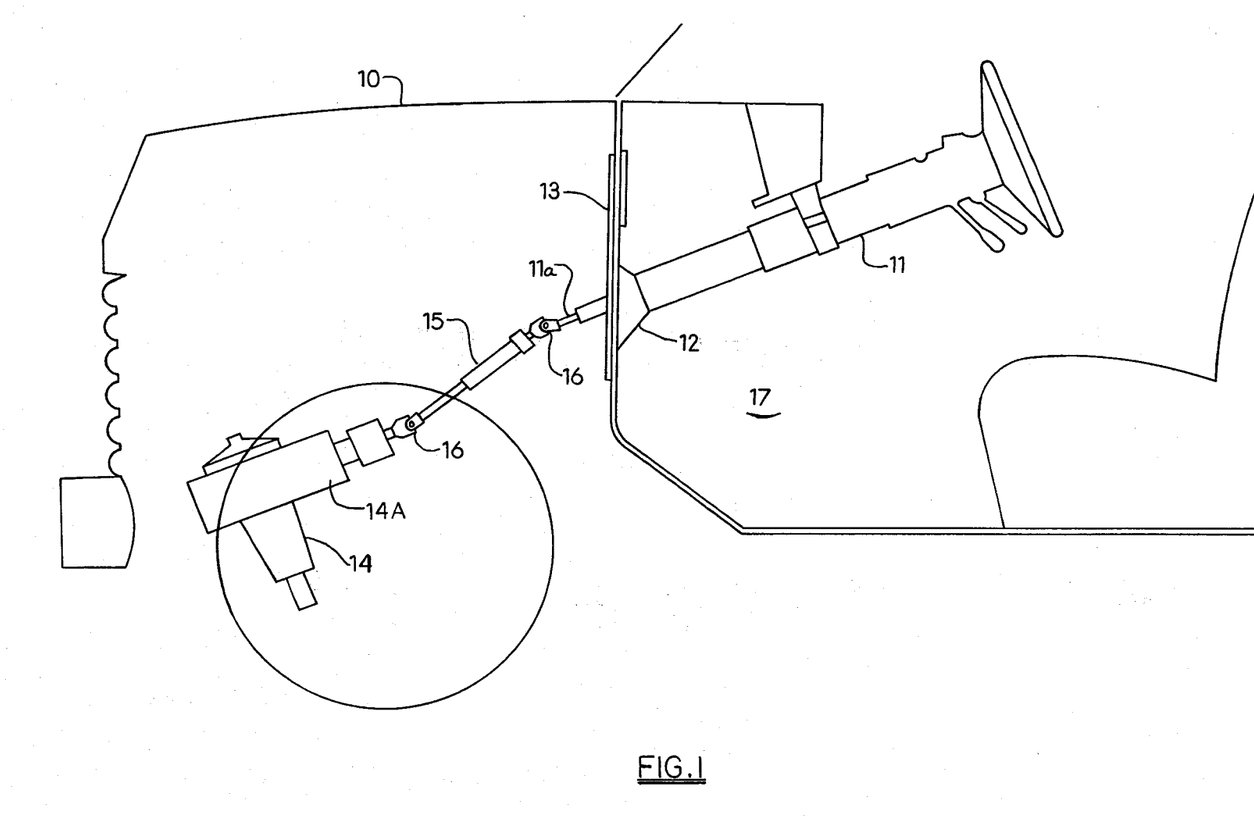
FIG. 1 is a fragmentary view of a truck vehicle illustrating the general elevational arrangement of the steering linkage for such vehicle and embodying the principles of this invention.

As illustrated in FIG. 1, a truck vehicle 10 typically has a steering column 11 mounted upon a bracket 12 which is supported through the fire wall 13 of the vehicle. The lower extremity of the steering column 11a is connected to the steering gear mechanism 14 by way of an intermediate shaft assembly 15 having universal joints 16. During a front-end collision, the primary impact may force the steering gear housing 14a rearwardly toward and into the passenger compartment 17, carrying with it the intermediate drive shaft assembly 15. This forces the inner end 11a of the steering column to be dislodged inwardly and counters the normal action of collapsibility of the steering column. Steering columns are usually designed to respond to the secondary impact of the driver engaging the steering wheel itself in a forward motion.

This invention provides for an assembly whereby the steering column may operate in its intended mode of collapsibility without interference from the intermediate drive linkage. The latter linkage is made sensitive to primary impact to break away without disrupting the normal collapsibility of the steering column.

Figure 2:
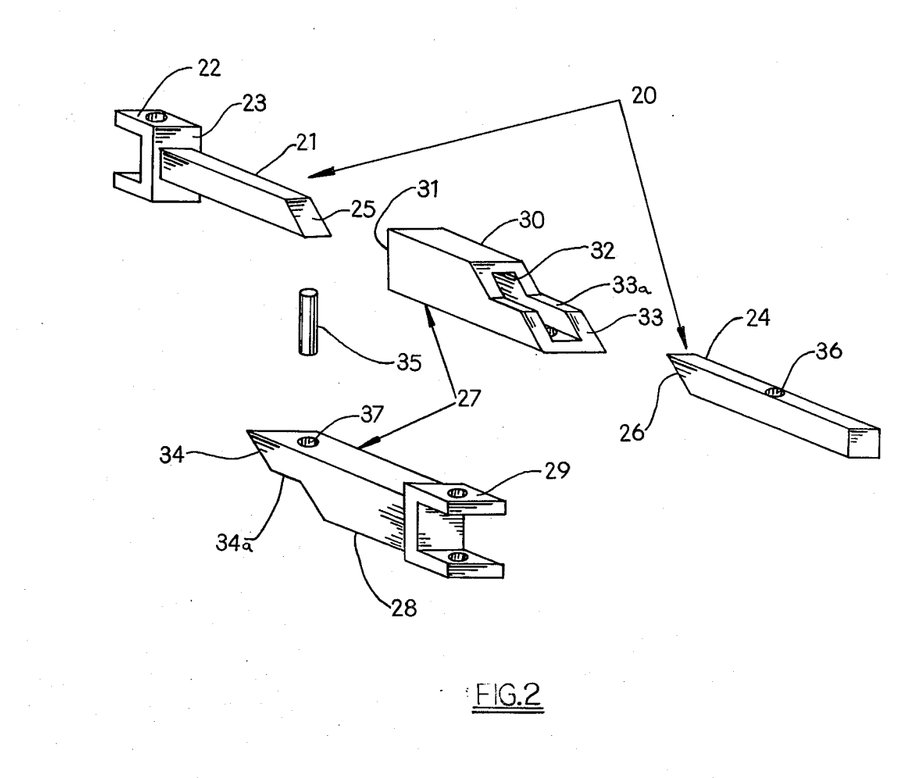
FIG. 2 is an exploded perspective view of elements of the breakaway shaft assembly forming part of the invention herein.

As shown in FIG. 2, the intermediate shaft assembly comprises a segmented shaft member 20 consisting of segments 21 and 24. Segment 21 has a clevis 22 to receive a universal joint assembly (not shown). The clevis 22 has a shoulder 23 at the extreme end of the segment. Both segments 21 and 24 have straight cylindrical bodies with mateable interengaging camming faces 25–26 defining a location of segmentation when so engaged. The camming faces each consist of a complementary sloping plane.

The segmented tube member 27 is comprised of a first segment 28 which carries at one end a clevis 29 for receiving a universal joint assembly (not shown), and another segment 30 having a generally flat faced end 31 to abut and engage the shoulder 23 of shaft segment 21. The tube segments are hollow, having an interior 32 complementary in cross-section to the cross-section of the shaft segments. The tube segments have camming surfaces 33 and 34 which are stepped at 33a and 34a, respectively.

The segmented tube member and one of the shaft member segments are retained together for conjoint axial movement under a first phase of axial loading by use of a retaining means which includes a plastic pin 35 inserted into aligned openings 36, 37 and 38. Such conjoint movement is retained until the shaft member segments 21–24 are interengaged at their camming surfaces 25–26. At this stage, further axial loading will cause the plastic pin 35 to be sheared at the planes between the top portions of segment 28–30 and shaft segment 24. The tube member is then free to telescopically move relative to the segmented shaft member which has its segment remaining in abuttment.

Means for limiting the telescopic travel of the tube member is provided in the form of shoulder 23 which is adapted to engage the flat face 31 of the tube segment 30 when it bottoms out thereagainst. When bottoming occurs, the length of the segments 30–28 have been predesigned so that the line of segmentation (comprised of the separating camming surfaces 33–34) is aligned with the line of segmentation (comprised of camming surfaces 25–26) for the shaft member. With such alignment and additional axial loading, the camming surfaces of both the tube and shaft force the tube and shaft member to break away and dislodge from their normal axial alignment. In this manner, the steering gear housing is prevented from being able to transmit force up through the steering linkage when being dislodged upon a vehicle collision.

Figure 3:
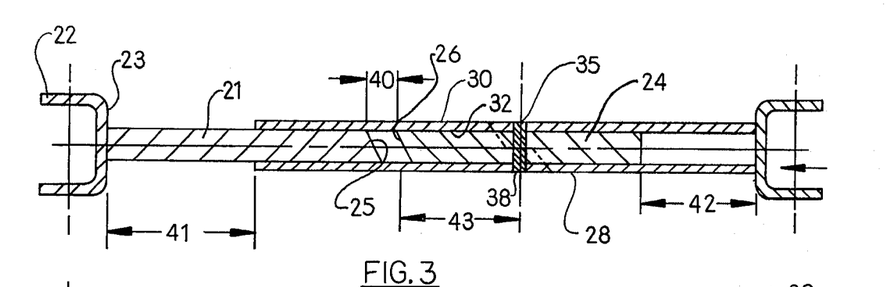
FIGS. 3, 4, 5 and 6 are central sectional views of the breakaway shaft assembly of FIG. 2 illustrating sequential operative steps of movement for such assembly.
Figure 4:
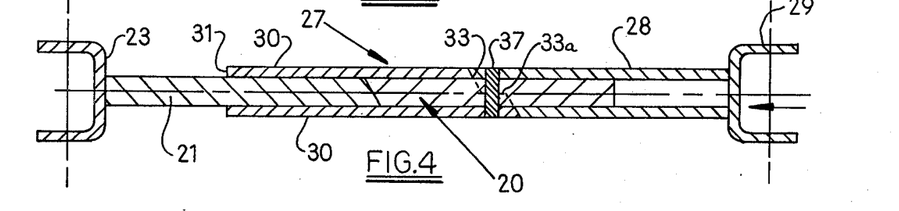
Figure 5:
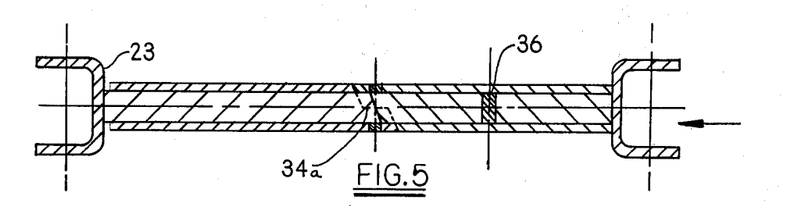
Figure 6:
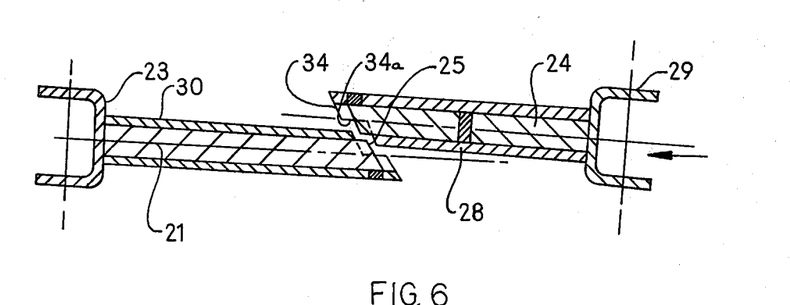

In normal steering operations, the intermediate shaft assembly (see FIG. 3) is arranged with space 40 between the mating faces of the shaft segments, and with space 41 between the end face 31 of tube segment 30 and the shoulder 23. The retaining means 35 (pin) is located to hold shaft segment 24 spaced at 42 from clevis 29, which distance is at least equal to the distance between the pin and the face 26 of segment 24. When axial loading is applied, the sub-assembly of tube segment 30 and 28 (initially abutted together) and shaft segment 24 move axially and conjointly toward shaft segment 21, eliminating space 40 and allowing the faces 25–26 to engage (see FIG. 4). Additional axial loading will cause the pin 35 to be sheared, allowing the tube member to telescopically slide over the shaft member (see FIG. 5) to take up the space 41. When face 31 bottoms or abuts shoulder 23 (see FIG. 6), the line of segmentation of each of the tube and shaft members will be aligned. This is made possible by predetermining the length of each of the segments to allow for such alignment. Still further axial loading will cause the camming surfaces of the tube and shaft members to break apart at the coincident locations of segmentation. By varying the lengths of the shaft and tube segments, the spacings 40–41–42 and axial movement allowed before breakaway can be altered. Premature breakaway can be avoided when some axial movement is allowed. The lengths must be such to permit space 41 to be at least of a dimension which is equal to or greater than the length of both spaces 42 and 43, minus space 40.

Figure 7:
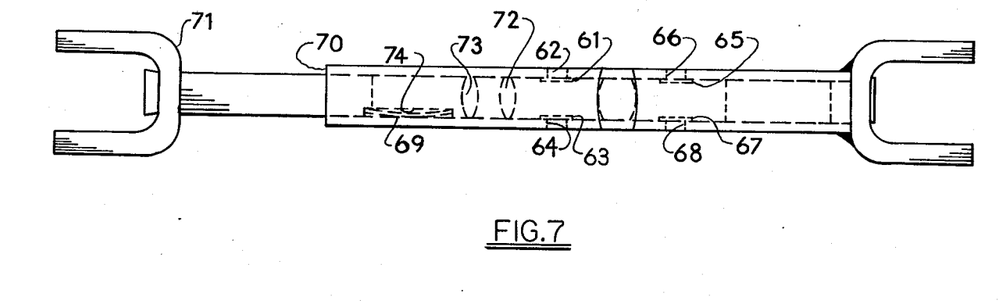
FIGS. 7, 8 and 9 are respectively elevational, plan, and exploded perspective views of a first alternative embodiment.
Figure 8:
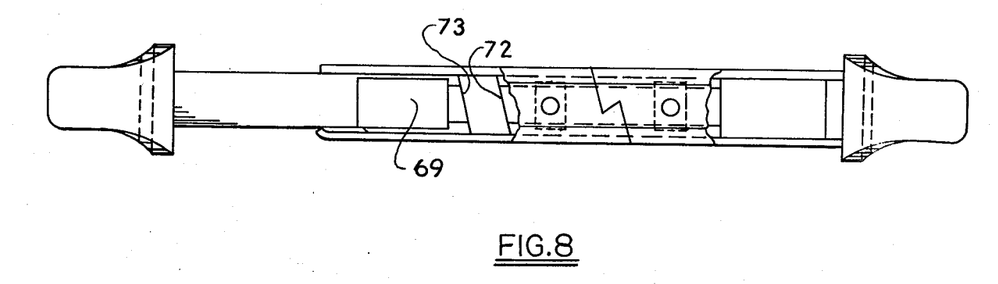
Figure 9:
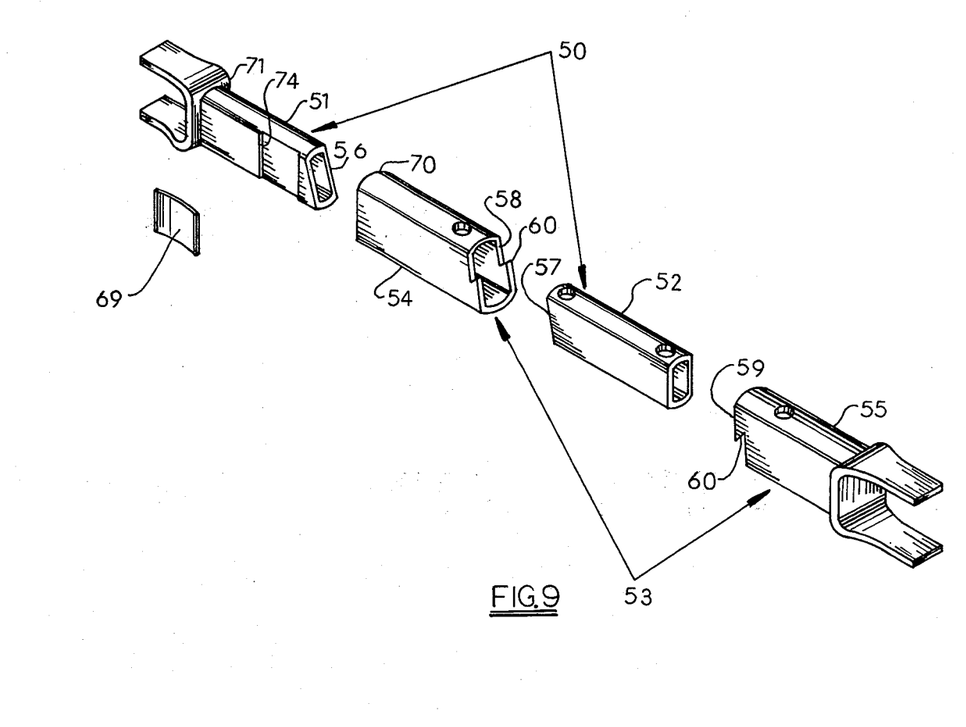
Figure 10:
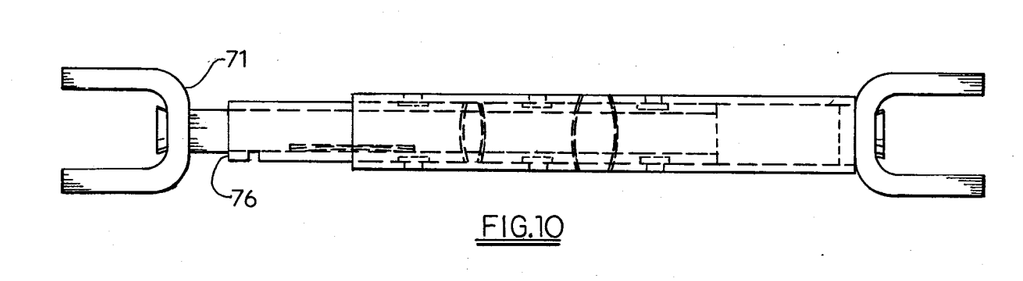
FIGS. 10 and 11 are respectively elevational and plan views of a second alternative embodiment.
Figure 11:
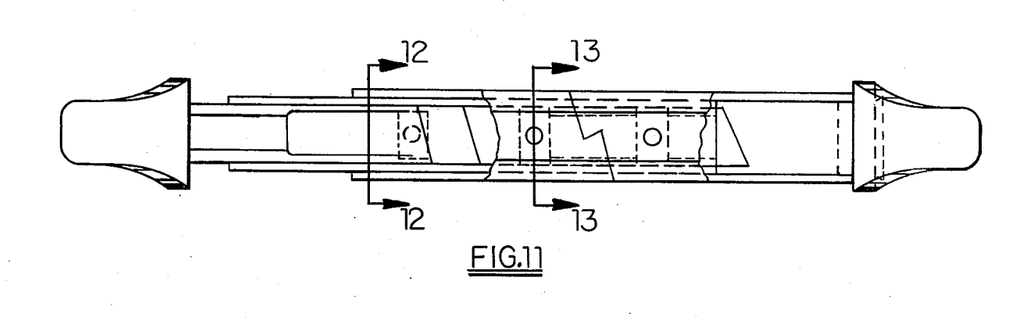
Figure 12:
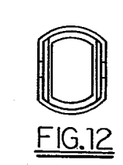
FIGS. 12 and 13 are section views taken respectively along lines 12—12 and 13—13 of FIG. 11.
Figure 13:
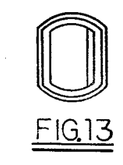
Figures 14, 15, 16, 17:
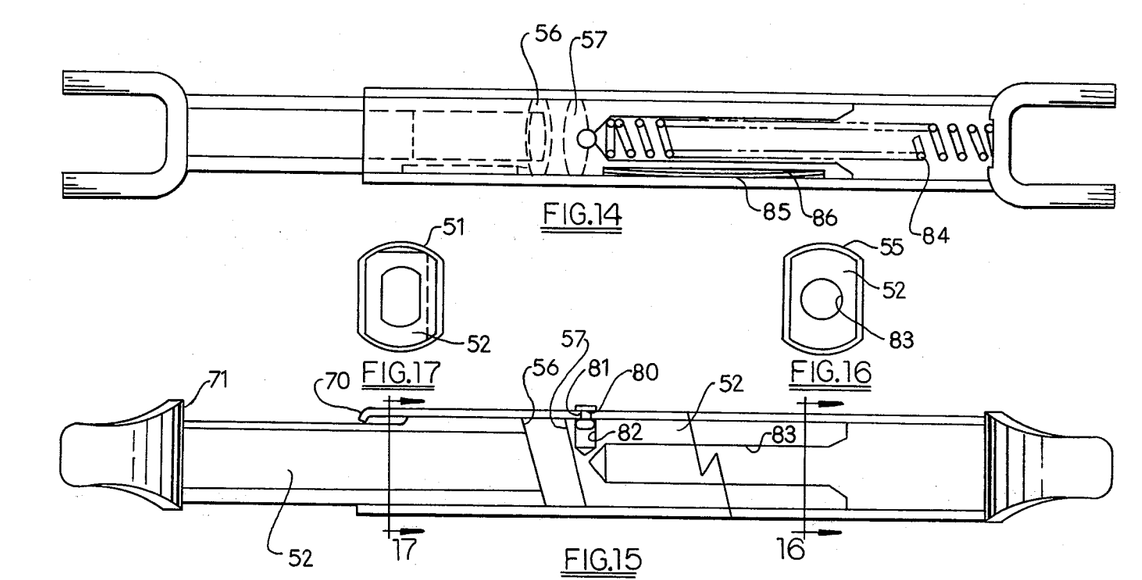
FIGS. 14 and 15 are respectively elevational and plan views of a third alternative embodiment.
FIGS. 16 and 17 are sectional views taken respectively along lines 16—16 and 17—17 of FIG. 15.

In the embodiment of FIGS. 7–9, all of the segments are hollow tubes. The shaft member 50 has segments 51 and 52 interengaged at mating camming surfaces 56–57. Tube member 53 has segments 54 and 55 normally locked together for conjoint axial movement at faces 58–59 by dovetail or serrated interlock 60 on such surfaces. In this embodiment, the retaining means to hold segments 54, 55 and 52 together for conjoint movement comprises not only the interlock 60, but also aligned opening pairs (61–62, 63–64, 65–66, 67–68), respectively, in the opposite sides of segment 52 and in the sides of tube segments 54 and 56. When the segments are positioned as in FIG. 7, plastic putty may be injected into the aligned pairs of openings (the opening in the shaft segment being larger than the opening in the tube segment to define a plastic holding head). Not until the faces 72–73 abut is the plastic putty sheared to allow the interlocked tube segments to telescopically ride over the remainder of the shaft. The telescoping movement is resisted by drag force of concave friction spring 69 seated in groove 74 in the side segment 51. When face 70 abuts shoulder 71, the interlock segmentation (58–59) and faces 56–57 will cam apart and dislodge (face 59 will jump over interlock 60 as a result of camming action).

In the embodiment of FIGS. 10–13, corresponding parts are identified the same as in FIGS. 7–9, except that here an additional telescoping tube 75 is deployed between the shaft and tube segments. The plastic putty, operating as a first part of the retaining means, acts between the tube 75 and the tube segments 54–55. The friction spring 69 operates as a second part of the retaining means and acts between the tube 75 and the shaft segments. Thus, in operation there are two steps for conjoint movement, first until the putty is sheared and then until face 76 abuts shoulder 71, at which time breakaway may occur with the alignment of segmentation of both the shaft and tube members.

In the embodiment of FIGS. 14–17, similar parts are similarly identified. Here the retaining means comprises a rivet 80 extending through an opening 81 in the tube segment 54 into an aligned opening 82 in the shaft segment 52. The latter has an axially oriented bore 83 seating a spring 84 which normally urges the faces 56–57 of the shaft segments into interengagement. By this construction, premature shearing of rivet 80 will not result in failure of the assembly, spring 84 maintaining the necessary engagement of the shaft segments. Friction spring 85 is deployed in a groove 86 of segment 52 to resist false telescoping forces not related to a collision. When face 70 abuts shoulder 71, breakaway separation will occur as in the other embodiments.

I claim:

1. A breakaway shaft assembly, comprising:
    (a) a segmented shaft member;
    (b) a segmented tube member, at least one of said segmented shaft and tube members having mating camming surfaces at the location of segmentation;
    (c) means for retaining said segmented tube member and one segment of said segmented shaft member together for conjoint axial movement due to axial loading until both segments of said shaft member are interengaged, whereupon said retaining means is overcome allowing both said tube member segments to telescopically move relative to said shaft member segments in response to further axial loading; and
    (d) means for limiting the telescopic travel of said tube member relative to said shaft member when said location of segmentation for each of said tube member and shaft member are aligned, whereupon breakaway separation of the segments of each of said members occurs in response to still further axial loading.

2. The assembly as in claim 1, in which said retaining means comprises a plastic pin extending laterally between said tube and shaft member.

3. The assembly as in claim 1, in which said retaining means comprises aligned grooves in one of said tube member segments and said one shaft member segment containing a plastic putty material which renders sufficient rigidity to normally maintain said segments together for conjoint movement.

4. The assembly as in claim 1, in which said retaining means comprises a rivet extending laterally between said tube and shaft segments.

5. The assembly as in claim 1, in which said camming surfaces between the segments of said tube members are comprised of stepped camming faces, said faces being disposed on opposite sides of the camming surface of said shaft when aligned.

6. The assembly as in claim 1, in which the segments of said tube member having interengaging first camming faces and are interlocked by reverse camming surfaces disposed between said first faces.

7. The assembly as in claim 1, in which said limiting means comprises a clevis member at the end of said shaft segment carrying an abutting shoulder adapted to engage the end of said tube member when said segmentations are aligned.

8. The assembly as in claim 1, in which additional friction means are disposed between said tube and shaft segments to resist telescopic movement.

9. The assembly as in claim 1, in which biasing means are employed to normally urge interengagement of the shaft segments as part of the conjoint assembly.

10. The assembly as in claim 1, in which said conjoint assembly is comprised of superimposed tube segments which are effective to telescope between them in addition to telescoping over the shaft segments.

* * * * *